United States Patent [19]

Sieber et al.

[11] Patent Number: 4,980,871

[45] Date of Patent: Dec. 25, 1990

[54] ULTRASONIC TRACKING SYSTEM

[75] Inventors: Jonathan D. Sieber, Wayland; Joseph S. Sieber, Cambridge; William K. Stewart, Woburn, all of Mass.

[73] Assignee: Visionary Products, Inc., Cambridge, Mass.

[21] Appl. No.: 396,987

[22] Filed: Aug. 22, 1989

[51] Int. Cl.⁵ .............................................. G01S 3/80
[52] U.S. Cl. .................................. 367/127; 367/120; 318/648; 318/649
[58] Field of Search .................. 367/120, 127, 2, 118, 367/119, 124, 129; 358/229; 318/648, 649

[56] References Cited

U.S. PATENT DOCUMENTS

| | | | |
|---|---|---|---|
| 1,126,095 | 1/1915 | Schiessler | 367/137 |
| 1,138,013 | 5/1915 | Phinney | 367/128 |
| 3,160,850 | 12/1964 | Dudley | 367/117 |
| 3,205,475 | 9/1965 | Foss | 367/117 |
| 3,336,572 | 8/1967 | Paull et al. | 367/117 |
| 3,475,721 | 10/1969 | Cappel, Jr. et al. | 367/124 |
| 3,588,798 | 6/1971 | Papineau | 367/117 |
| 3,731,273 | 5/1973 | Hunt | 367/13 |
| 3,777,305 | 12/1973 | Stoutmeyer | 367/127 |
| 3,905,009 | 9/1975 | Hughes et al. | 340/6 R |
| 4,055,830 | 10/1977 | Wilson et al. | 340/16 R |
| 4,067,015 | 1/1978 | Mogavero et al. | 358/125 |
| 4,173,008 | 10/1979 | Keith et al. | 367/124 |
| 4,193,073 | 3/1980 | Kohnen | 342/56 |
| 4,239,356 | 12/1980 | Freudenschuss et al. | 354/23 R |
| 4,307,456 | 12/1981 | Ice et al. | 367/108 |
| 4,317,186 | 2/1982 | Nishi et al. | 367/127 |
| 4,516,226 | 5/1985 | Peynaud et al. | 367/6 |
| 4,574,368 | 3/1986 | Lipschutz | 367/108 |
| 4,597,068 | 6/1986 | Miller | 367/87 |
| 4,601,025 | 7/1986 | Lea | 367/125 |
| 4,601,557 | 7/1986 | Bogle et al. | 352/140 |
| 4,622,657 | 11/1986 | Clare | 367/129 |
| 4,690,549 | 9/1987 | Nakada | 356/4 |
| 4,720,805 | 1/1988 | Vye | 358/229 |
| 4,752,791 | 6/1988 | Allred | 358/229 |
| 4,905,315 | 2/1990 | Solari et al. | 318/640 |

OTHER PUBLICATIONS

Gerald D. Maslin; A Simple Ultrasonic Ranging System; May 12, 1983.
National Semiconductor Corporation; LM1812 Ultrasonic Transceiver.
Massa Products Corporation; Model TR-89/B Series Types: 23, 31, 40.
Texas Instruments; Sonar Ranging Receiver; Mar. 1988.
Texas Instruments; Sonar Ranging Module; Jan. 1985.
Polaroid; Ultrasonic Ranging System.
C. Biber, S. Ellin, E. Shenk, J. Stempeck; Polaroid Corporation; The Polaroid Ultrasonic Ranging System; Oct. 1980.

Primary Examiner—Ian J. Lobo
Attorney, Agent, or Firm—Wolf, Greenfield & Sacks, P.C.

[57] ABSTRACT

An ultrasonic tracking system comprising a transmitting unit and a drive unit. The transmitting unit is carried by the subject to be tracked and produces brief, periodic ultrasonic bursts. The drive unit has an ultrasonic receiver and a motorized assembly capable of tilting and panning an attached camera in response to control signals from the receiver. This receiver employs three ultrasonic microphones located at three of the four corners of an imaginary square centered on and perpendicular to the axis of the camera lens. The receiver measures the relative arrival times of signals received by the microphones, determines the direction and degree to which the camera is not pointed directly at the subject, and supplies control signals to the motorized assembly, to drive motors to re-orient the camera (and receiver) to point toward the subject.

10 Claims, 12 Drawing Sheets

ULTRASONIC TRACKING SYSTEM

FIELD OF THE INVENTION

This invention relates to ultrasonic measuring and tracking systems and, more particularly, to a system for enabling a camera to track a moving subject.

BACKGROUND OF THE INVENTION

Television and motion-picture cameras used for transmitting or recording images of moving subjects are usually aimed by a human operator, either directly or via remote control. Sometimes, however, problems are associated with the use of such cameras. For example, a camera operator may not be available, perhaps because the likely operator wishes to participate in the action being recorded (as in the making of home movies). Or the motion of the subject may be too rapid or unpredictable to be followed by a human operator (or at least the available operator), perhaps because the subject is participating in a sporting event or athletic competition. In any event, the camera operator is forced to watch the event through the camera's view finder. He or she cannot watch the event occur "live," since someone has to manage the camera. Thus, a parent who would like to both watch his or her child perform in a school play or athletic event and record the event for future replay must either forego the recording or forego the live enjoyment.

Accordingly, it is an object of the invention to provide a system which allows a camera to remain pointed at, and track, a moving subject without operator intervention.

SUMMARY OF THE INVENTION

The present invention is a control system comprising two units. The first unit is a small, battery-operated, omni-directional, ultrasonic transmitter which is carried by the subject to be tracked. This transmitter produces brief, periodic bursts of sound at frequencies above the range of human hearing. The second unit comprises a motorized camera drive capable of tilting and panning an attached camera. In an exemplary embodiment, a battery-operated ultrasonic receiver is attached to the camera drive. The receiver is tuned to the same frequency as the transmitter carried by the subject. This receiver employs three ultrasonic microphones, together with electronic circuitry to detect and amplify the ultrasonic signals generated by the transmitter and intercepted by the microphones. The microphones are located at three of the four corners of an imaginary square centered on and perpendicular to the axis of the camera lens. The signals emanating from the subject will arrive at all three microphones simultaneously only if the camera is pointed directly at the subject. The receiver measures the relative arrival times of signals received by the microphones, determines the direction and degree to which the camera is not pointed directly at the subject, and causes a servo-system to drive motors to re-orient the camera (and receiver) to point toward the subject.

The foregoing and other features, objects and advantages of the invention will be more fully understood by reading the detailed description below, in conjunction with the drawing.

DETAILED DESCRIPTION

Camera Drive Unit

Figure 1:
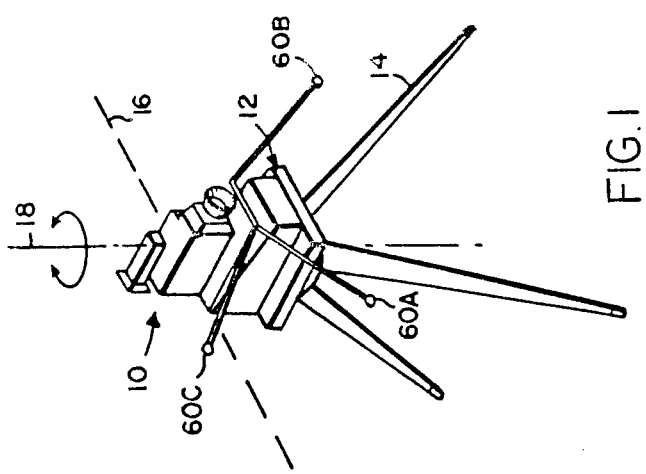
FIG. 1 is a pictorial illustration of the drive unit of the invention, as used for pointing a camera.

Referring to FIG. 1, a television or motion-picture camera or other device 10 (hereafter referred to as a camera, without loss of generality) is attached to a platform or mount which is part of a motorized drive unit, generally designated 12, that is in turn mounted to a tripod 14 or other support. Drive unit 12 can tilt camera 10 up and down about horizontal axis 16 from about 30 degrees below the horizon to about 30 degrees above the horizon. The drive unit can also pan the camera left and right about vertical axis 18 through repeated 360 degree circles. The drive unit responds to ultrasonic signals received via microphones 60A, 60B, and 60C to control servo motors (not shown) to move the camera mount.

Figure 2:
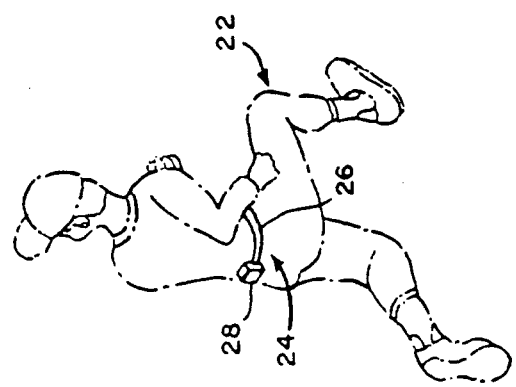
FIG. 2 is a diagrammatic illustration of a subject, such as an athlete, wearing the transmitter unit of the invention.

A subject 22 (see FIG. 2) who is to be recorded (e.g., an athlete), is provided with an ultrasonic transmitter 24 to be worn or carried on his or her person. The transmitter unit may include, for example, an elastic belt 26 with buckle, for wearing around the waist of the subject. Attached to the belt are three or more transducer units (only one transducer unit, 28, being showing in the drawing) connected by flexible cables imbedded in belt 26.

In a manner to be described more fully below, the drive unit 12 tracks the location of the transmitter unit 24, to keep the camera pointed at the subject.

TRANSMITTER

Figure 3:
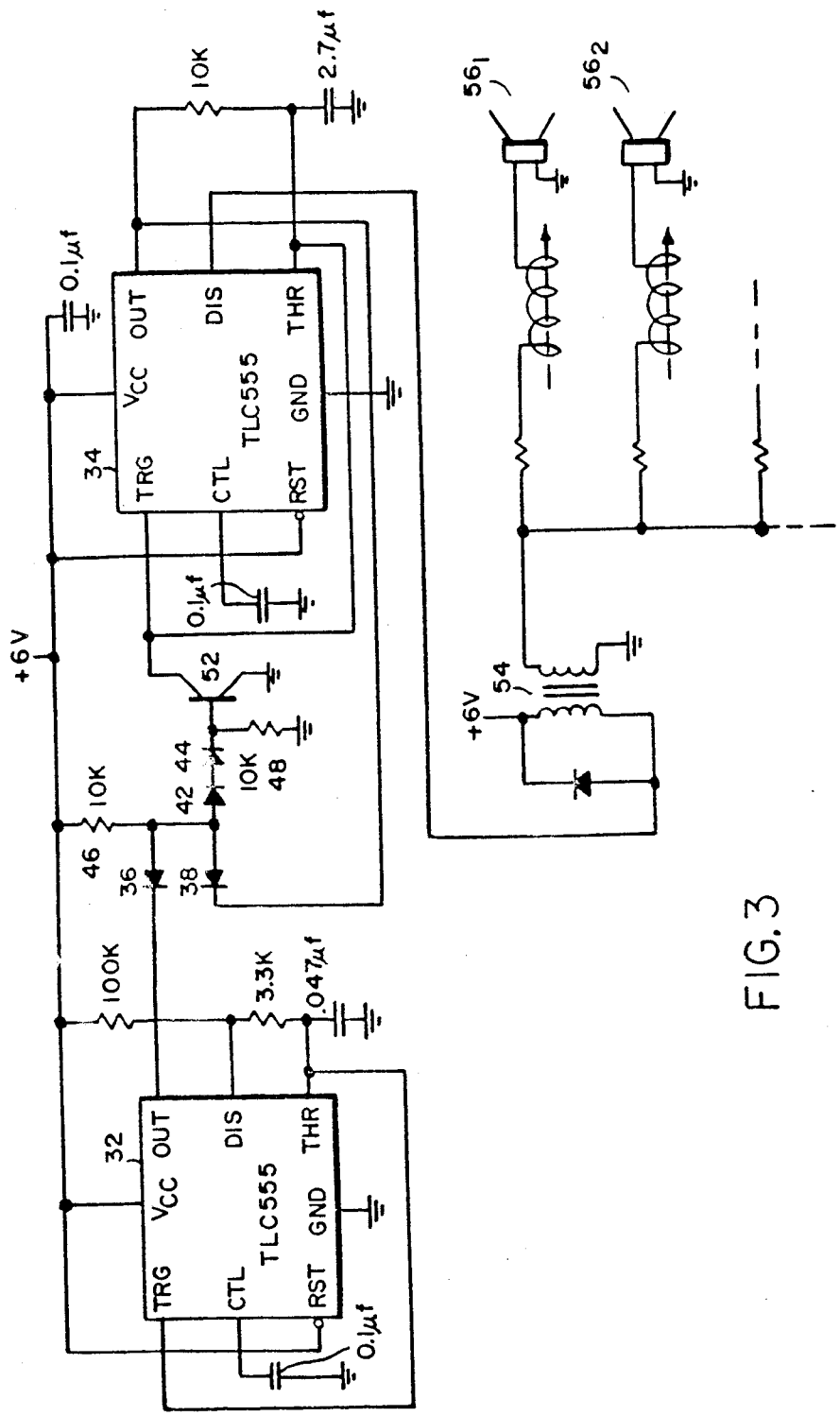
FIG. 3 is a schematic circuit diagram of an exemplary embodiment of the transmitter unit.

A typical transmitter is shown in FIG. 3. It will be noted that the transmitter consists of two CMOS 555-timer-based oscillators 32 and 34. The first timer 32 oscillates at 30 Hz (33 ms period) and has a duty-cycle of 97% (its output is high for 32 ms and low for 1 ms). The output of the second oscillator 34 is a 50% duty-cycle, 26.5 kHz square wave. This second oscillator is gated on and off cleanly by the output of the first oscillator via a 2-input open-collector NAND gate constructed from four diodes (36, 38, 42 and 44), two resistors (46, 48), and an NPN transistor (52). When the output of the first oscillator is high, the output of the second oscillator is high. When the output of the first oscillator goes low, the second oscillator begins oscillating and continues to do so until the output of both oscillators return high. The output of the second oscillator, which therefore consists of a 1 ms, 26.5 kHz burst every 33 ms, is coupled via transformer 54 to n series-tuned piezo-electric ultrasonic transducers $56_1$–$56_n$. In practice, n=2 will generally suffice, but other values (including n=1) can be employed when the situation warrants.

Drive Unit

As shown in FIGS. 4–7, drive unit 12 includes two direct-current motors designated 72 and 74 respectively. Through mechanisms depicted in these figures and described below, motor 72 tilts the camera mount up and down and motor 74 pans the camera mount left and right. Since the camera is securely fastened to the mount, it undergoes the same motions. The motors are driven by electronic circuitry located on circuit boards (not shown) inside the housing 75. This circuitry is powered by batteries (also not shown).

Figure 5:
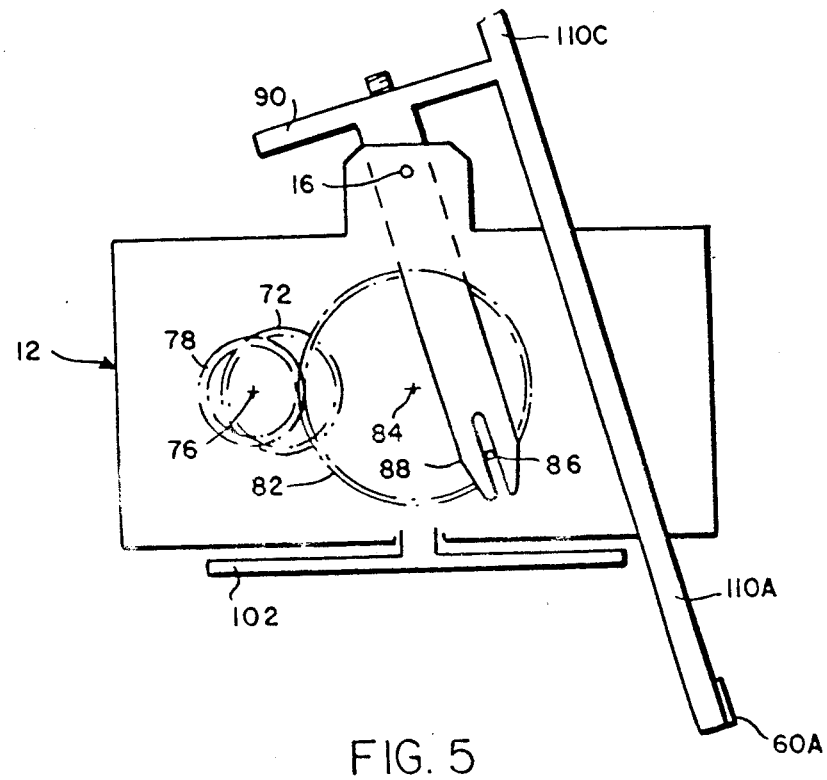
FIG. 5 is a diagrammatic, internal side view of the drive unit, showing the motor, shafts, and gears used for tilting the camera.
Figure 6:
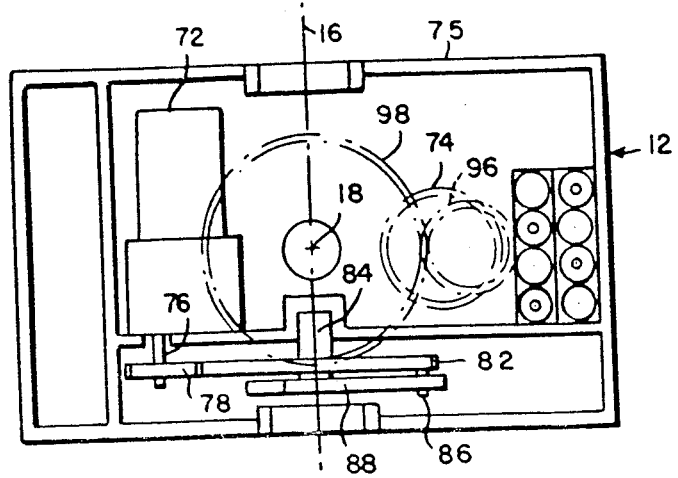
FIG. 6 is a diagrammatic, internal top view of the camera drive, showing the motors, shafts, and gears used for panning and tilting the camera.
Figure 7:
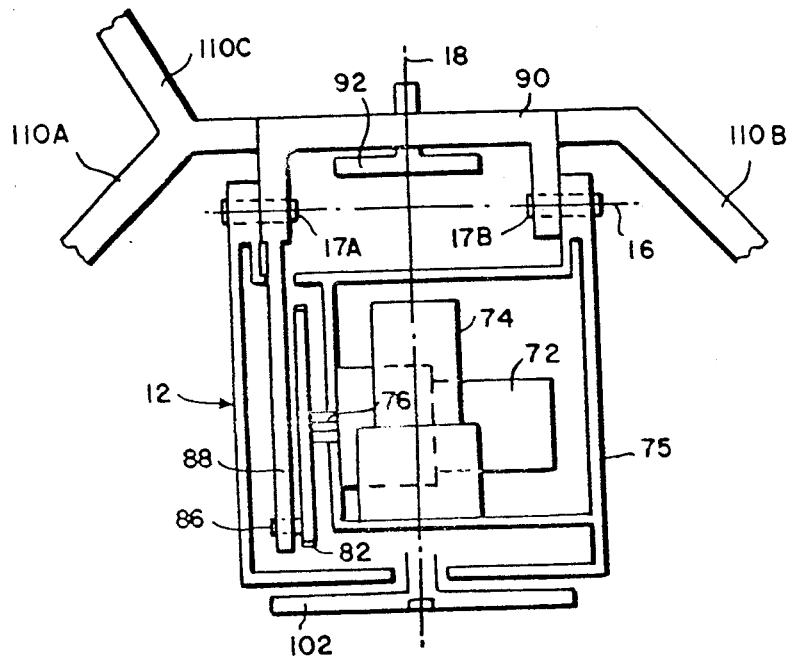
FIG. 7 is a diagrammatic, internal front view of the camera drive, showing some of the motors, shafts, and gears used for panning and tilting the camera.

Referring to FIGS. 5, 6, and 7, it will be noted that motor 72 is mounted with its output shaft 76 horizontally oriented. As can be seen most clearly in FIGS. 5 and 6, a gear 78 affixed to output shaft 76 engages a larger gear 82, which is free to rotate on shaft 84. As can be seen most clearly in FIG. 5, a pin 86 is attached to the face of gear 82. This pin engages a slot in lever 88, which is pivoted about horizontal axis 16. Attached to the opposite end of lever 88 is a mounting platform 90 to which the camera is secured via knob 92. Thus, as motor 72 rotates gear 78 via output shaft 76, large gear 82 rotates on shaft 84, lever 88 pivots about the horizontal axis 16, and camera platform 90 tilts up or down.

Figure 4:
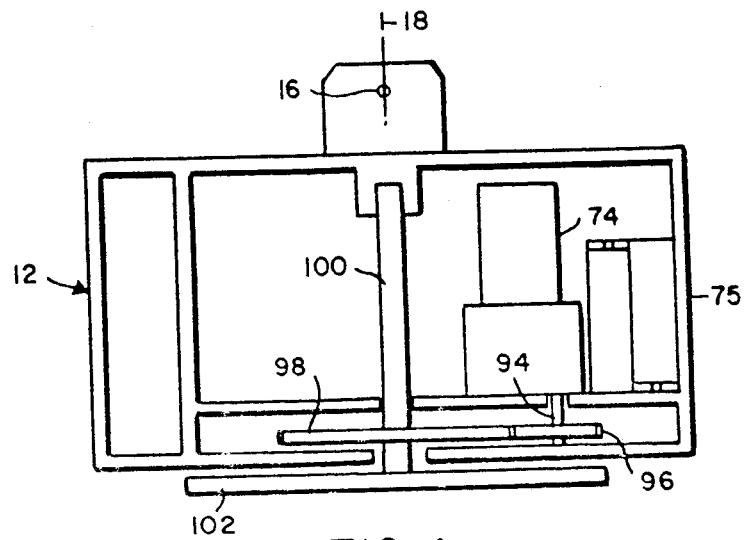
FIG. 4 is a diagrammatic internal side view of the drive unit, showing the motor, shafts, and gears used for panning the camera.

Referring to FIGS. 4, 6, and 7, it will be noted that motor 74 is mounted with its output shaft 94 vertically oriented. As can be seen most clearly in FIGS. 4 and 6, a gear 96 affixed to output shaft 94 engages a larger gear 98, which is affixed to a shaft 100 mounted coaxially with vertical axis 18. Shaft 100 is fixed to the base 102 of drive unit 12, which in turn is fixed to tripod 14. Thus, large gear 98, shaft 100, and base 102 are fixed to one another and to tripod 14, and remain stationary at all times. All of the remainder of drive unit 12 (i.e., everything except gear 98, shaft 100, and base 102) is supported by shaft 100 and is free to rotate about it. Thus, as motor 72 rotates gear 96 via output shaft 94, the entire assembly (except gear 98, shaft 100 and base 102) is rotated about shaft 100, and thus about vertical axis 18. In this manner, camera 10 is panned right or left.

Figure 9:
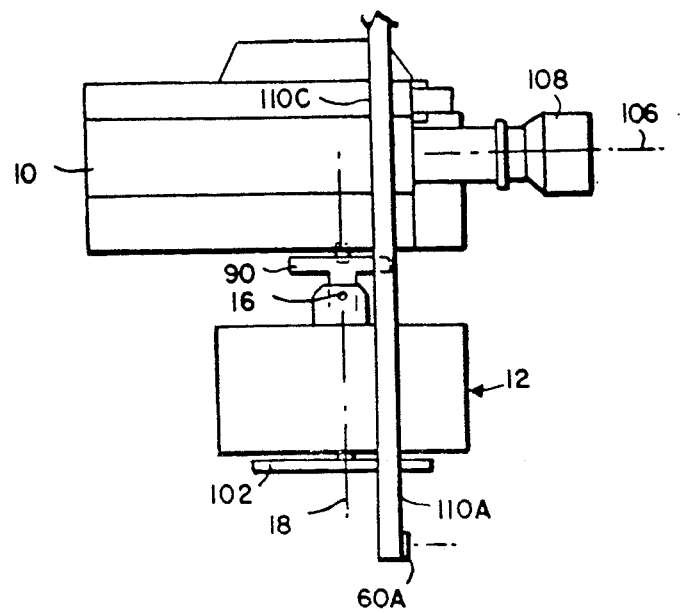
FIG. 9 is a simplified side elevational view of the drive unit, with a camera attached.
Figure 8:
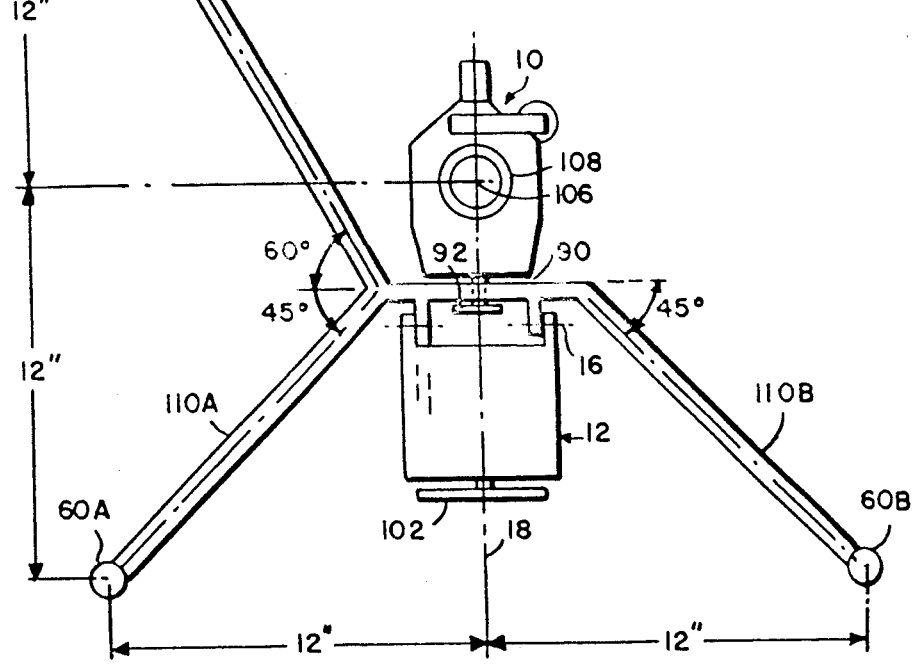
FIG. 8 is a simplified front elevational view of the drive unit (i.e., mount and receiver, with motors and servomechanism not visible), with a camera attached.

Referring to FIGS. 8 and 9, three 26.5 kHz piezo electric transducers 60A, 60B, and 60C are suspended at three of the four corners of an imaginary 2' by 2' square centered on and perpendicular to the axis 106 of the camera lens 108. The transducers 60A, 60B, and 60C are supported by rigid rods 110A, 110B, and 110C respectively, which are cantilevered from camera platform 90. Transducers 60A, 60B, and 60C act as microphones and are electrically connected to the printed circuit boards via flexible coaxial cable (not shown). These cables may, for example, pass through the hollow centers of the rigid supporting rods 110A, 110B, and 110C, then along camera platform 90 and lever 88 into the main body of drive unit 12.

Figure 10:
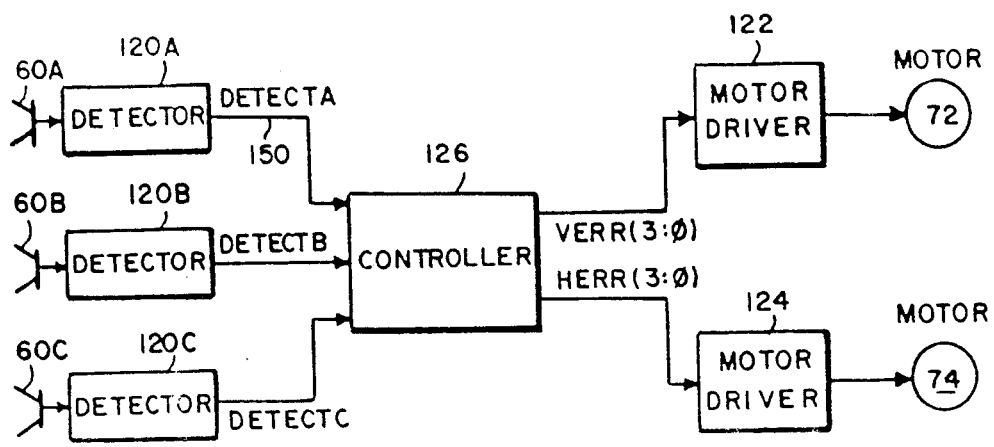
FIG. 10 is a functional block diagram of a drive unit according to the invention.

Three detector circuits 120A, 120B and 120C are shown in the block diagram of FIG. 10, one for each of the three ultrasonic transducers 60A, 60B, and 60C, respectively. Also shown are two motor driver circuits 122 and 124, one for each of the two DC motors 72 and 74, respectively; and a controller circuit 126 operatively connecting the detectors to the motor drivers. Each of the transducers 60A, 60B, and 60C receives the ultrasonic bursts emitted by the transmitter unit and supplies corresponding electrical signals to its associated detector circuit. The detector circuit detects the presence of an ultrasonic burst and produces a rectangular pulse whose leading edge coincides with the beginning of the detected burst. These pulses are routed to the controller, which measures the delay between the pulses from the three detectors and loads digital error registers (not shown) with binary numbers that reflect the direction and degree to which the camera is not pointed at the subject. These error registers are updated each time an ultrasonic burst is received. Their values are converted into DC motor drive voltages by the identical horizontal (i.e., pan) and vertical (i.e., tilt) motor driver circuits, which drive the tilt and pan motors respectively in the proper direction and at the proper speed to keep the camera pointed at the subject.

Figure 11:
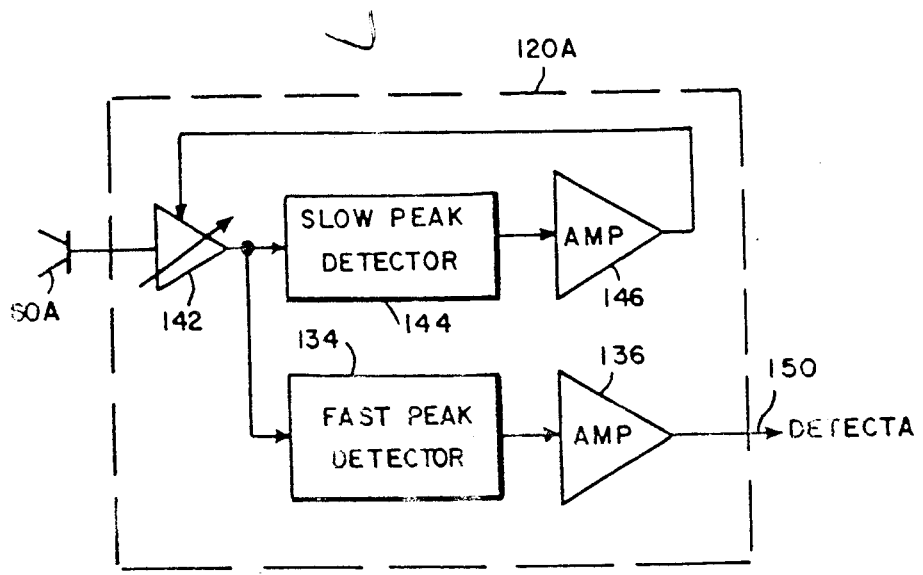
FIG. 11 is a block diagram of an exemplary detector for use in the drive unit of FIG. 10.

As shown in FIG. 11, a detector using detector 120A as an example is shown in greater detail. The detector consists of a tuned amplifier with automatic gain control (AGC) 142, followed by a peak detector 134 and comparator 136. The tuned amplifier discriminates against noise and interference by filtering out all frequencies that differ from the transmitter frequency by more than a few hundred Hertz. Since the voltage developed by transducers 60A, 60B and 60C in response to an ultrasonic signal varies from microvolts to millivolts depending on the distance between the receiver and the transmitter, automatic control of the gain of the tuned amplifier is needed. To accomplish this, the output of the tuned amplifier 142 is fed into a peak detector 144 characterized by a slow decay time-constant. The time-constant is slow relative to the interval between ultrasonic bursts, but fast enough to allow the gain of the tuned amplifier to be controlled in such a way that when an ultrasonic burst from the target is received, it will be amplified (by amplifier 142) to a consistent voltage. The output of the tuned amplifier 142 is also fed into a peak detector 134 with a fast decay time-constant (fast, that is, relative to the interval between ultrasonic bursts). This peak detector produces a triangular pulse every time an ultrasonic burst is received. These triangular pulses are "squared up" by comparator 136, producing on output line 150 signals suitable for processing by a digital circuit.

Figure 12:
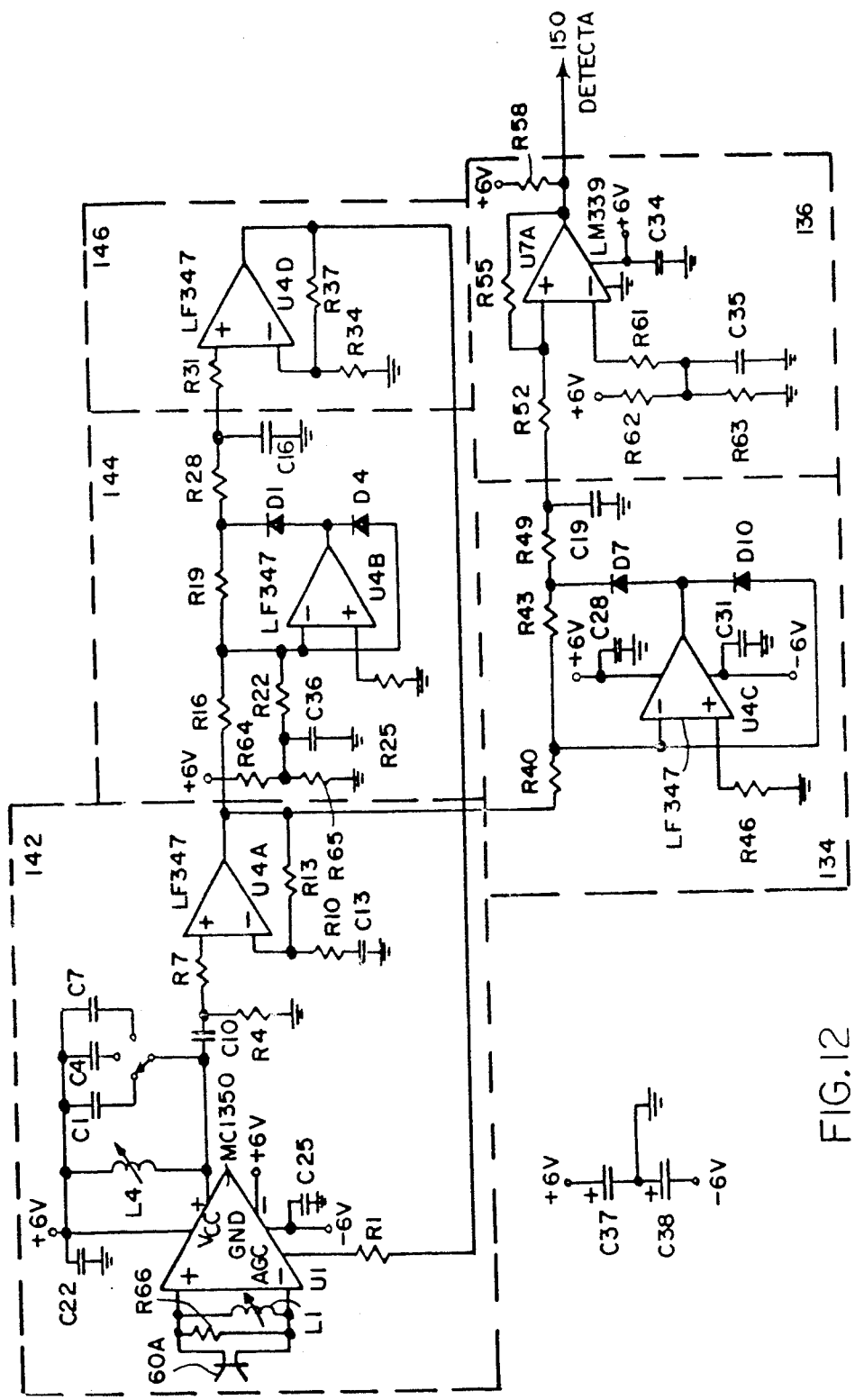
FIG. 12 is a schematic circuit diagram of an exemplary embodiment of the detector of FIG. 11.

Referring to FIG. 12, choke L1 and resistor R66 parallel-tune transducer 60A to broaden its frequency response. Amplifier U1, choke L4 and capacitors C1, C4, and C7 form a tuned amplifier with automatic gain control (AGC) exhibiting a maximum gain of 60 dB, a bandwidth of 500 Hz, and switch-selectable center frequencies of 24.1 kHz, 26.4 kHz, and 28.7 kHz. Amplifier U4A, capacitors C10 and C13, and resistors R4, R7, R10, and R13 form an AC-coupled broadband amplifier with a gain of 20 db. Amplifier U4B, resistors R16, R19, R25, and R28, capacitor C16, and diodes D1 and D4 form a precision, inverting, negative peak detector with an attack time of 1 ms and a decay time of 1 s. This peak detector is biased negatively by resistors R22, R64, and R65 in such a way that a positive voltage will appear on capacitor C16 if and only if the negative peaks of the signal at the output of amplifier U4A exceed 1.0 V. The voltage on capacitor C16 is boosted 20 dB by amplifier U4D and resistors R31, R34, and R37, then fed back to the AGC input of amplifier U1 via resistor R1. The amplitude of the signal appearing at the output of U4A will remain 2.0 V peak-to-peak as the transducer 60A output voltage ranges from microvolts to millivolts.

The amplitude-stabilized signal at the output of U4A is applied to another precision, inverting, negative peak detector formed by amplifier U4C, resistors R40, R43, R46, and R49, capacitor C19, and diodes D7 and D10. This peak detector exhibits an attack time of 1.0 us and a decay of time of 1.0 ms. A positive voltage will appear on capacitor C19 if any signal is present at the output of U4A. Comparator U7A and resistors R52, R55, and R58 form a non-inverting voltage comparator with hysteresis, with a reference level of 0.1 V established by resistors R62 and R63. The action of this circuit is such that a square pulse is produced at the output of comparator U7A, as previously described.

Capacitors C22–C38 provide power-supply decoupling and noise filtering. The circuitry for detecting ultrasonic bursts intercepted by transducers 60B and 60C is identical to that just described for transducer 60A.

Controller

Figure 13:
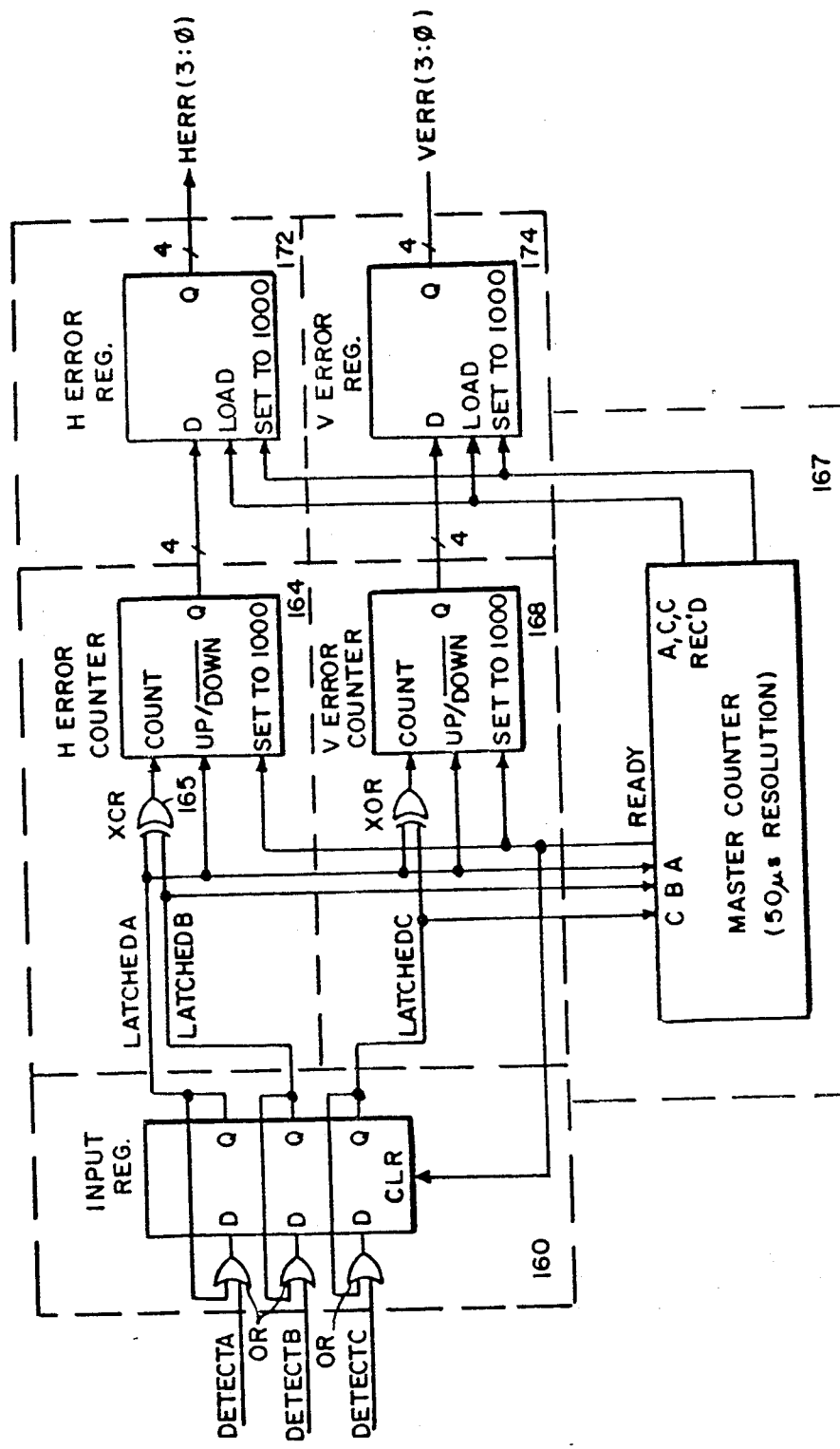
FIG. 13 is a block diagram of an exemplary controller for use in the drive unit of FIG. 10.

The controller 126 computes the delay between the rising edge of DETECTA signal on line 150 and the rising edge of the comparable signal DETECTB for transducer 60B, which delay is a measure of the horizontal positioning error (pan error). This error is expressed as a 4-bit offset-binary number HERR (3:0). Simultaneously, the controller computes the delay between the rising edges of the DETECTA signal and the like signal DETECTC from detector 120C, which is a measure of the vertical positioning error (tilt error). This error is expressed as the 4-bit binary offset number VERR (3:0). The operation of the controller can best be understood by referring to FIG. 13. Positive pulses in the DETECTA, DETECTB, and DETECTC signals are latched by the input register 160, whose outputs, once set, remain set until the register is cleared as explained below. Concentrating on horizontal positioning errors (pan errors) for the moment, it should be noted that the interval between the rising edges of positive pulses in the DETECTA and DETECTB signals is proportional to the pan error. If the pulse on DETECTA leads the pulse on DETECTB, the camera is pointing to the left of the target; if the pulse on DETECTA lags the pulse on DETECTB, the camera is pointing to the right of the target; and if the rising edges of the pulses on DETECTA and DETECTB are simultaneous, the camera is pointing directly at the target. The up/down counter 164, labeled "horizontal error counter", is controlled by the input register and an exclusive-OR gate 165. The counter 164 begins counting as soon as a rising edge occurs in either the DETECTA or DETECTB signals, and stops counting as soon as a rising edge has occurred on both DETECTA and DETECTB. The counter counts up if DETECTA rises before DETECTB, and it counts down if DETECTB rises before DETECTA. As described below, the up/down counter 164 has been initialized to 1000 binary, which is near the center of its range and is defined as "zero error". The counter 164 then either counts up towards 1111, which represents maximum positive error, or down towards 0000, which represents maximum negative error. In the event the counter reaches 1111 or 0000 before a rising edge has occurred in both the DETECTA and DETECTB signals, the counter ceases to count, "saturating" at its maximum positive or negative value.

The master counter 167 governs the operation of the other elements of the controller in the following fashion. As soon as rising edges have occurred in the DETECTA, DETECTB, and DETECTC signals, the master counter transfers the error values arrived at by the horizontal and vertical error counters 164 and 168 to the horizontal and vertical error registers 172 and 174. The master counter then waits approximately three-quarters of the interval between transmitted ultrasonic bursts before clearing the input register 160 and resetting the error counters to 1000. This prevents reflections or echos of the transmitted bursts, which may be loud enough to trigger the detectors, from affecting the controller. Having cleared the input register and reset the error counters, the master counter waits approximately one-half of the interval between transmitted bursts. Normally, another burst is received by all three transducers before this additional waiting period expires, and the master counter again updates the error registers and resets itself, repeating the cycle just described. If this additional waiting period expires before rising edges occur in the DETECTA, DETECTB, and DETECTC signals, either the transmitter has ceased operating, has moved out of range, or the path from the target to one or more of the receiving transducers has become obstructed. In this case, the master counter resets the horizontal and vertical error counters and registers to 1000 and clears the input register continuously for another period of time equal to one-half the interval between transmitted bursts, to avoid picking up a reflection or echo of a possibly missed burst. At the end of this additional waiting period, the master counter resets itself and waits indefinitely for pulses to occur in the DETECTA, DETECTB, and DETECTC signals, indicating that transmission has resumed or become unobstructed.

Figure 14A:
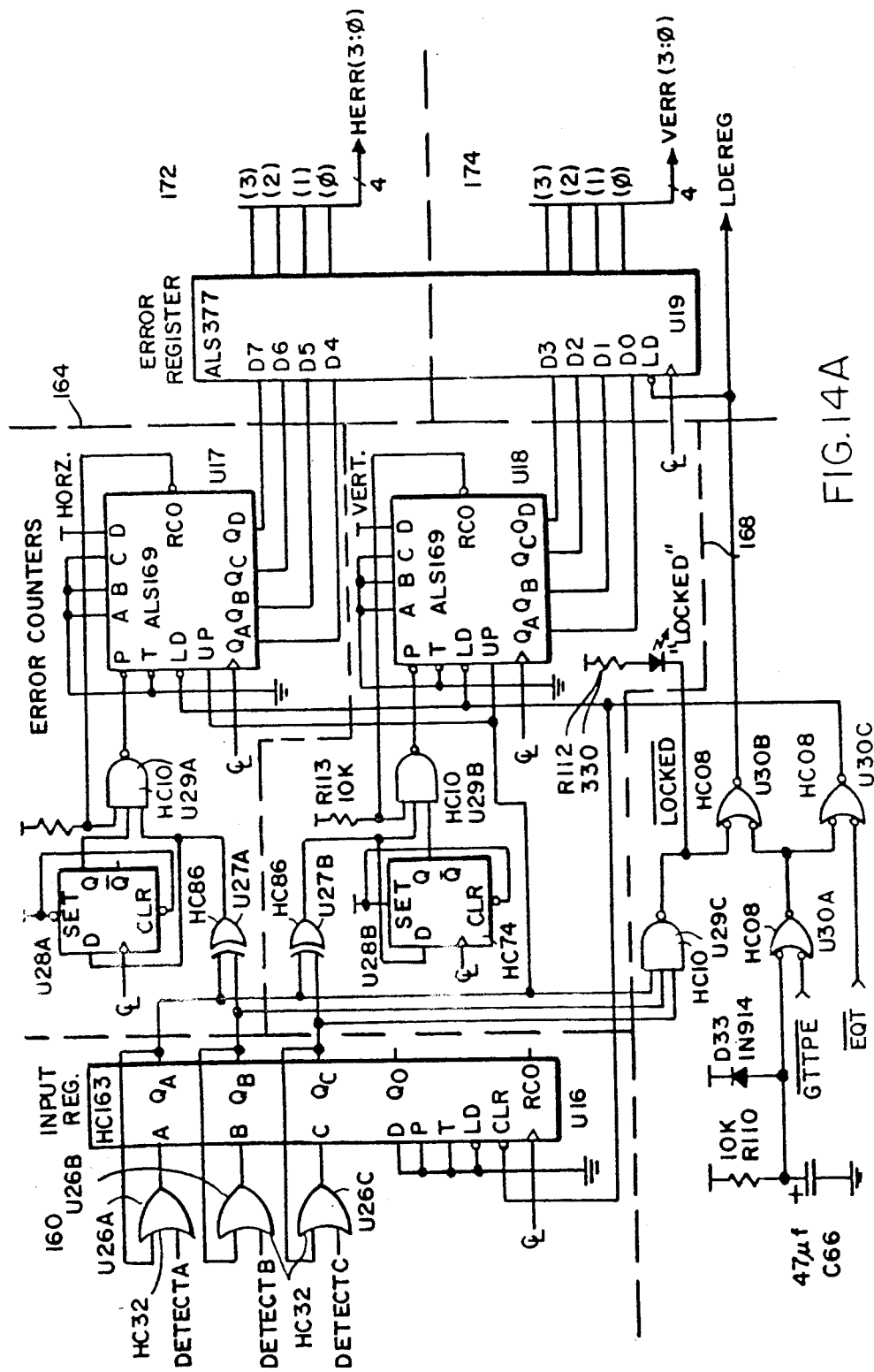
FIGS. 14A and 14B together are a schematic circuit diagram of an exemplary embodiment of the controller of FIG. 13.
Figure 14:
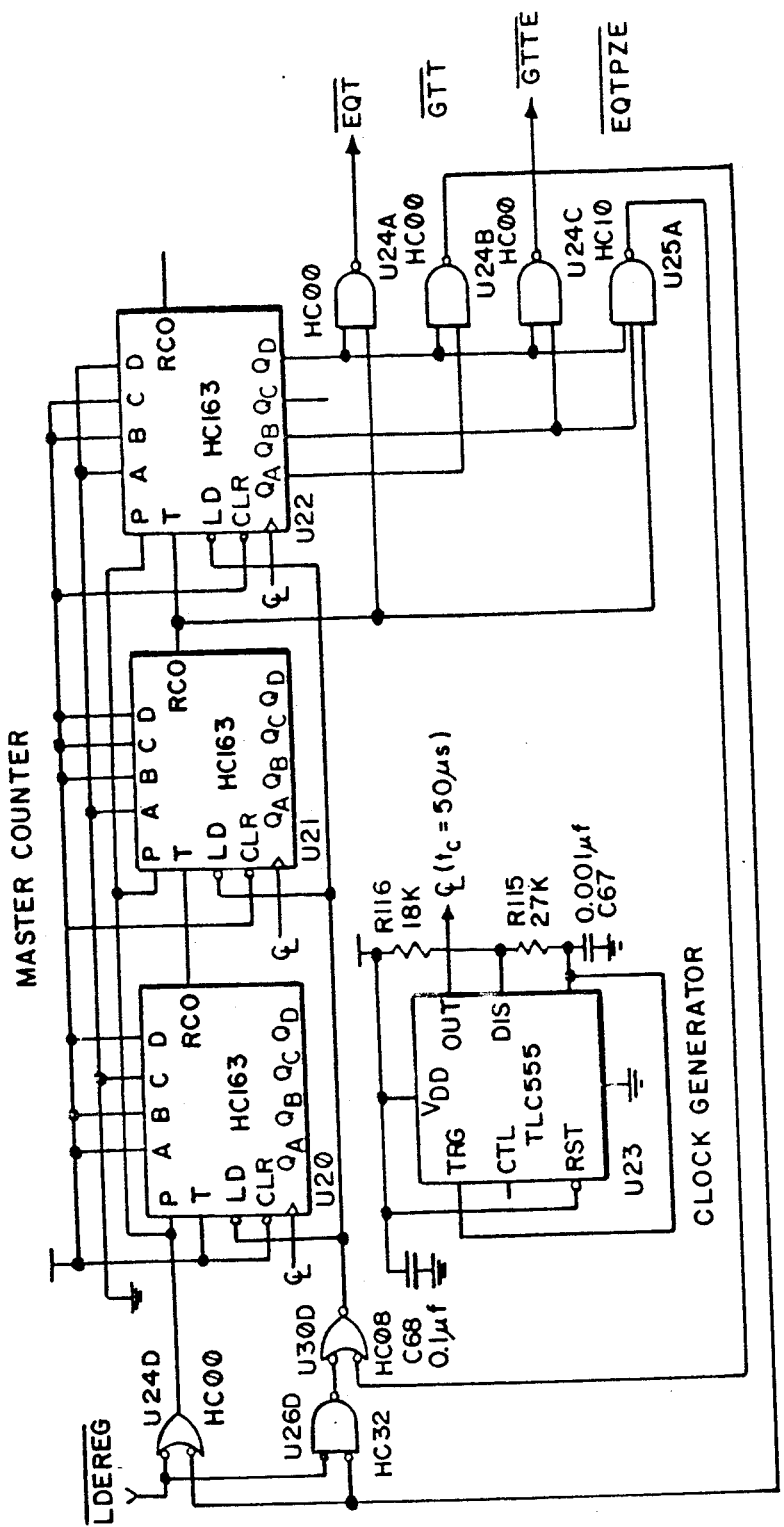

Referring to FIGS. 14A and 14B, register U16 and OR gates U26A–U26C form the input register. Counter U17, register U28A, NAND gate U29A, and XOR gate U27A form the horizontal error counter. Counter U18, register U28B, NAND gate U29B, and XOR gate U27B form the vertical error counter. Register U28A is included to keep the horizontal error counter from couting unless the rising edges of DETECTA and DETECTB are separated by at least two clock pulses, or a minimum of 50 μs. Otherwise, the rising edges of the DETECTA and DETECTB pulses could be arbitrarily close to one another but still be on opposite sides of a clock pulse, resulting in a non-zero error value and unnecessary and undesirable camera motion. Register U28B performs the same function with respect to the vertical error counter. Register U19 forms the horizontal and vertical error registers 172, 174. Counters U20–U22 and gates U24 (A, B, C, and D), U25A, U26D, U29C, and U30 (A, B, C, and D) form the master counter. The setting of the error registers to 1000 when transmission ceases or is obstructed, as described above, is actually implemented by setting the error counters to 1000, then loading the error registers. Timer U23, resistors R115 and R116, and capacitors C67 and C68 form a 50 μs clock generator that synchronously clocks all the registers and counters in the controller. The LED 180, when lit, indicates that transmissions emanating from the target are being received. Resistor R110, capacitor C66, and diode D33 form a power on reset circuit that ensures that the controller behaves predictably when power is applied, whether or not the transmitter is already transmitting.

Motor Drivers

Figure 15:
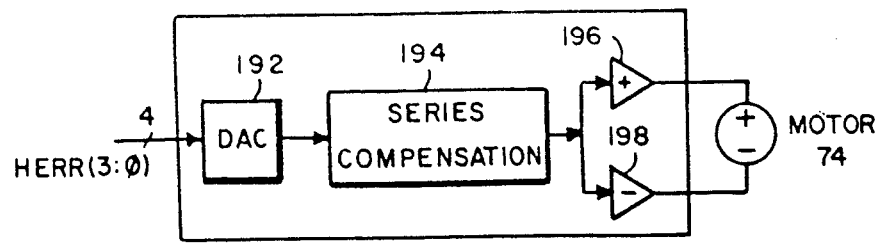
FIG. 15 is a block diagram of an exemplary motor driver for use in the drive unit of FIG. 10.

Referring to FIG. 15, the motor drivers 124 and 122 respectively convert the 4-bit offset binary signals HERR(3:0) and VERR(3:0), which are the contents of the controller's horizontal and vertical error registers respectively, into DC voltages. First, the digital error signal is converted to analog form by a digital-to-analog converter (DAC) 192. Then, series compensation 194 is applied to implement proportional-plus-integral control and to stabilize the closed-loop servomechanism. The compensation circuitry drives the motors through a pair of bridge audio power amplifiers 196 and 198.

Digital-to-analog converter U8, amplifier U10A, resistors R70, R72, R74, R76, R78, R80, R82, and R84, and capacitors C40 and C48 form a 4-bit offset-binary digital-to-analog converter (DAC) 192. R78 is adjusted so that the output of amplifier U10B is zero when HERR (3:0)=1000 binary, which is zero in 4-bit offset binary. Resistors R80 and R82 and capacitor C48 give the DAC a transfer function with a pole at 0.3 rad/s and a zero at 3.0 rad/s. Together with the transfer function of motor 72, this minimizes the zeroth-order and first-order error coefficients of the system while assuring its stability. Amplifier U10B, resistors R86, R88, and R90, and capacitor C54 form an amplifier with a transfer function that exhibits a low-frequency magnitude of one, a zero at 10 rad/s, and a pole at 100 rad/s. The purpose of this amplifier is to improve the stability of the system by adding positive phase shift to the loop gain in the vicinity of the crossover frequency. Motor 74 is driven by a bridge power amplifier consisting of amplifiers U12 and U14, transistors Q1, Q3, Q5, and Q7, diodes D21, D23, D25, and D27, resistors R92, R94, R96, R98, R100, R102, R104, R106, R108, R110, R112, R114, and R116, and capacitors C56 and C58.

Capacitors C42, C44, C46, C50, and C52 provide power supply decoupling and noise filtering. As indicated above, the circuitry for driving motor 72 is identical to that just described for motor 74.

A more elaborate embodiment might include signal processing circuitry for discriminating among the various signals coming from the multiple transducers of the transmitter unit 24. The discrimination could be performed on the basis of amplitude or frequency, for example (assigning separate frequencies to each transmitting transducer). Implementation details are within the skill of electronics engineers.

Alternative Embodiments

Figure 17:
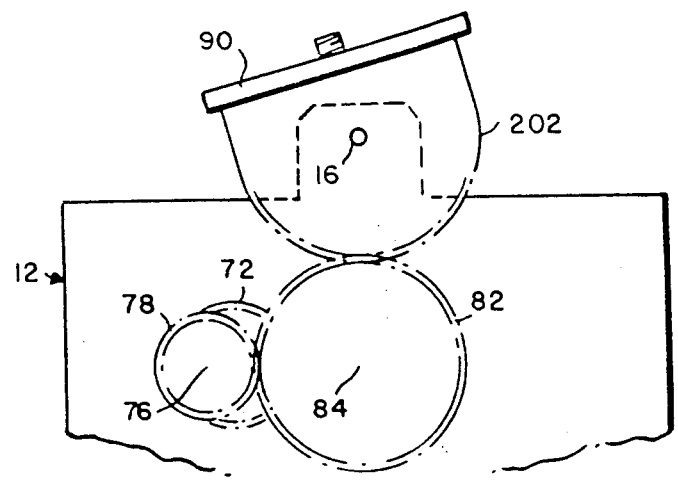
FIG. 17 is a diagrammatic, internal side view of the drive unit, showing an alternative implementation of the camera tilting mechanism.

FIG. 17 shows an alternative embodiment of the camera tilting mechanism. Pin 86 and lever 88 of FIG. 56 have been replaced by a semi-circular gear 202 attached to camera platform 90. The principal advantages of this mechanism are that greater degrees of tilt can be obtained and that the degree of tilt is a linear function of the degree of rotation of motor 72.

Alternative implementations of the controller circuit include the use of one or more programmable logic devices or a single-chip microcomputer instead of discrete counters, registers, and gates.

For many purposes, only single axis tracking is required. This is readily accomplished by only using so much of the disclosed apparatus as is needed. For example, elimination of transducer 60C, supporting rod 110C, detector 120C, motor driver 122, motor 72, and the like, yields a simpler, cheaper system which will pan a camera left and right but not up and down.

At other times, the subject being tracked will always face the camera, allowing use of only a single transmitting transducer.

The modulation scheme may also be changed. Instead of using on-off keying of a carrier (i.e., continuous-wave transmission), the periodic transmit "burst" may be formed by frequency-shift or phase-shift keying in which frequency or phase changes are made abruptly to a constant-amplitude signal. The transmitted signal can also be encoded with a code the receiver is designed to recognize.

Figure 18:
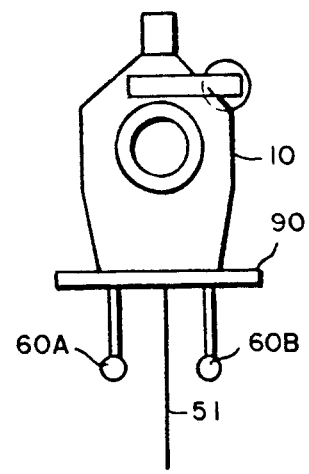
FIG. 18 is a diagrammatic illustration of an alternative embodiment wherein relative received amplitude is used to discriminate the direction of the transmitter unit relative to the drive unit.
Figure 16:
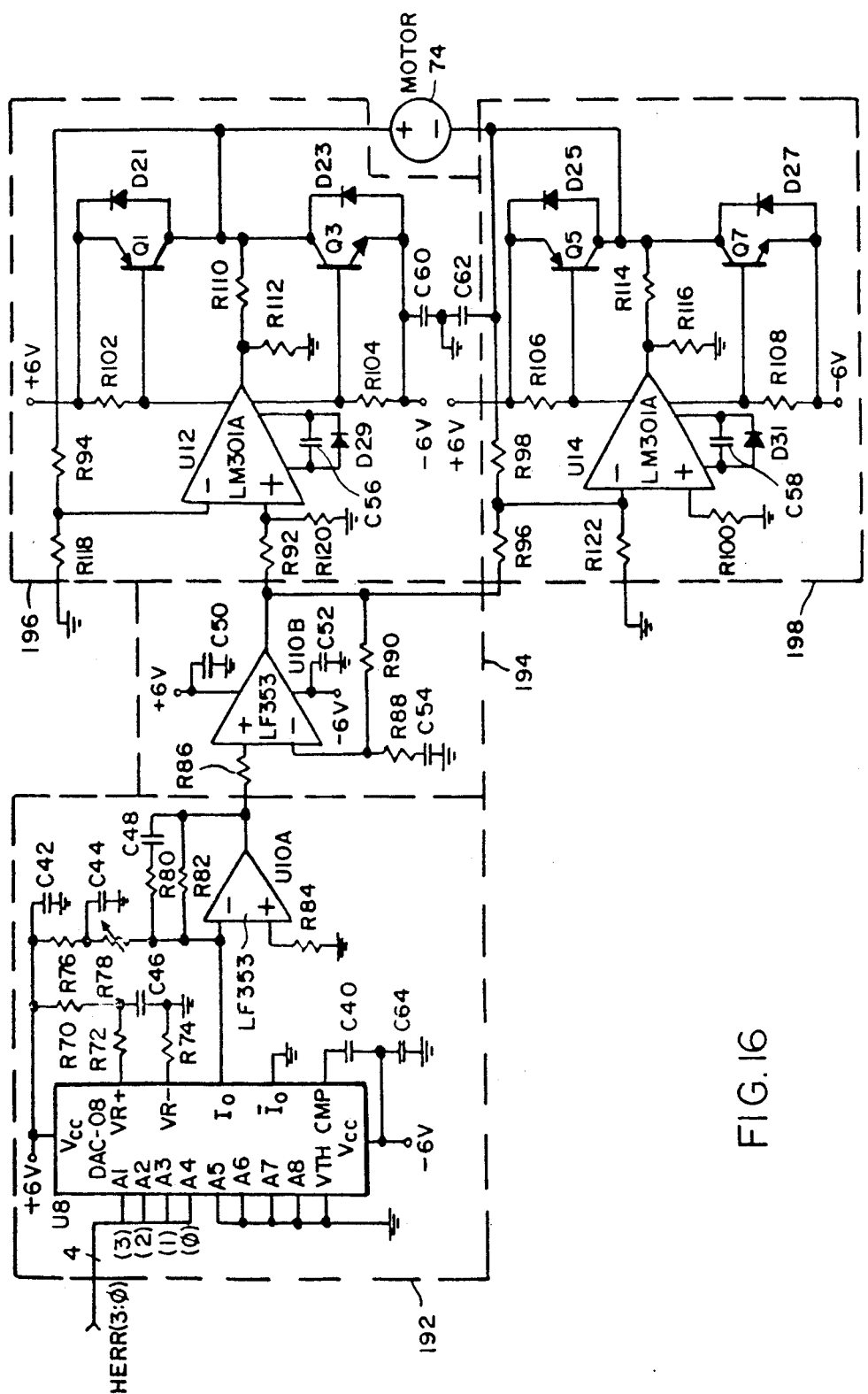
FIG. 16 is a schematic circuit diagram of an exemplary embodiment of the motor driver of FIG. 15.

Other transducer arrangements can also be substituted for that shown. For example, a pair of receiving transducers may be placed next to one another but separated by a partition 51 (as in FIG. 18) to control horizontal or vertical camera positioning. Instead of measuring the delay between the reception of a transmitted signal by two relatively widely spaced receiving transducers, as in the illustrated embodiment, this alternative would operate as follows: If the camera points to the left of the target, only one transducer (e.g., 60A) will receive the transmitted signals, since the partition obstructs the path to transducer 60B. Conversely, if the camera points to the right of the target, only the other transducer (e.g, 60B) will receive the transmitted signals. If and only if the camera is pointed more-or-less directly at the target will both transducers 60A and 60B receive the transmitted signals. To determine not only the direction, but also the degree to which the camera fails to point directly at the target, several transducers could be arranged in a line or arc, with partitions between each adjacent pair. The controller circuitry previously described could be simplified to respond to the mere presence or absence of pulses at the outputs of the previously-described detector circuits. Furthermore, light or radio-frequency signals could be used instead of acoustic signals, which would substantially increase the practical operating range of the tracking device.

(Owing to their much greater speed, determining the relative arrival times of electromagnetic signals at points separated by only a few feet is substantially more difficult than performing the same tasks with acoustic signals. This is one reason acoustic signals are used in the illustrated embodiment.)

Most television and motion-picture camera are equipped with zoom lenses so that the camera operator can alter the width of the camera's field of view. In the illustrated embodiment, the tracking device measures only the relative arrival times of signals received by the ultrasonic transducers mounted on the drive unit. However, both the drive unit and the transmitter unit could include synchronized clocks, allowing circuitry in the drive unit to measure the absolute delay between the transmission and reception of each ultrasonic burst. From this information and the speed of sound in air (which is well known), the distance between the camera lens and the subject can be computed. The computed distance information can be used to control the camera's focal distance and the field of view in its zoom lens. Alternately, the distance could be measured periodically, using an independent ultrasonic echo-ranging device (preferably operating on a different ultrasonic frequency than the tracking system, or time-multiplexing a single frequency).

Accordingly, it will be appreciated that the detailed disclosure has been presented by way of example only and is not intended to be limiting. Various alternatives, modifications and improvements will readily occur to those skilled in the art, and may be practiced without departing from the spirit and scope of the invention. The invention is limited only as required by the following claims and equivalents thereto.

What is claimed is:

1. A system for permitting a device to point at and track the movements of a moving subject, comprising:
   a. transmitting unit to be worn by the subject to be tracked, for transmitting pulsed ultrasound signals which can be tracked;
   b. control means, including sensors located in fixed positions relative to the device, for receiving the signals from the transmitting unit, means for comparing the arrival times of said signals at multiple ones of said sensors, and means responsive to the means for comparing, for generating control signals as a function of said comparison; and
   c. a drive unit for moving the device about an axis in response to said control signals to maintain the device pointed at the subject.

2. A system for permitting a device to point at and track the movements of a moving subject, comprising:
   a. a transmitting unit to be worn by the subject to be tracked, for transmitting pulsed ultrasound signals which can be tracked;
   b. means including three sensors for receiving signals from the transmitting unit and for generating, in response to differences in arrival time of transmitted signals at the multiple sensors, tilt control signals and panning control signals;
   c. a device mounting member;
   d. the sensors being located in fixed relation to the device mounting member; and
   e. a vertical drive unit and a horizontal drive unit for respectively tilting and panning the device mounting member in response to respective tilt and panning control signals, to maintain the device pointed at the subject when the device is mounted on the mounting member.

3. The system of claim 2 wherein the three ultrasonic sensors are disposed at locations defining three corners of a square, two of the transducers being disposed about a panning axis and two of the transducers being disposed about a tilt axis.

4. The system of claim 3 wherein the means for receiving produces the tilt control signals responsive to the relative arrival time of the ultrasound signals at the transducers disposed about the tilt axis and the means for receiving produces the panning control signals responsive to the relative arrival time of the ultrasound signals at the transducers disposed about the panning axis.

5. Apparatus for maintaining a device pointed at and tracking the movements of a moving subject who is carrying a transmitting unit which emits recognizable pulsed ultrasonic signals, comprising:
   a. a device mounting member;
   b. means including sensors located in fixed relation to the device mounting member for receiving the signals emitted by the transmitting unit and for generating, in response to differences in the arrival times of said signals at multiple sensors, control signals; and
   c. a drive unit for moving the device mounting member in response to the control signals, to maintain the device pointed at the subject when the device is mounted on the mounting member.

6. The apparatus of claim 5 wherein two of the sensors are disposed about a single axis of movement of the drive unit, and the control signals effectuate movement of the drive unit about said axis.

7. The apparatus of claim 6 wherein the drive unit includes a vertical drive unit and a horizontal drive unit for respectively tilting and panning the device mounting member in response to respective tilt and panning control signals, to maintain the device pointed at the subject.

8. The apparatus of claim 7 wherein the sensors include at least three ultrasonic transducers whose locations define three corners of a square, two of the transducers being disposed about a panning axis and two of the transducers being disposed about a tilt axis.

9. The system of any of claims 1, 2, and 5 wherein the ultrasound signals comprise a pulse burst.

10. The system of claim 9 wherein the control means includes a plurality of ultrasonic transducers disposed about said axis.

* * * * *